(12) United States Patent
Martin et al.

(10) Patent No.: US 8,774,561 B2
(45) Date of Patent: Jul. 8, 2014

(54) CONSOLIDATING INFORMATION RELATING TO DUPLICATE IMAGES

(75) Inventors: Timothy B. Martin, Sunnyvale, CA (US); Gregory Charles Lindley, Sunnyvale, CA (US); Benjamin Wojtyna, Pittsburgh, PA (US)

(73) Assignee: Apple Inc., Cupertino, CA (US)

( * ) Notice: Subject to any disclaimer, the term of this patent is extended or adjusted under 35 U.S.C. 154(b) by 310 days.

(21) Appl. No.: 12/873,681

(22) Filed: Sep. 1, 2010

(65) Prior Publication Data

US 2012/0051668 A1 Mar. 1, 2012

(51) Int. Cl.
*G06K 9/54* (2006.01)

(52) U.S. Cl.
USPC .............. 382/305; 382/100; 707/999.001; 707/999.1

(58) Field of Classification Search
None
See application file for complete search history.

(56) References Cited

U.S. PATENT DOCUMENTS

| | | | |
|---|---|---|---|
| 6,018,744 A * | 1/2000 | Mamiya et al. ................. 1/1 |
| 6,243,502 B1 * | 6/2001 | Christensen et al. ......... 382/305 |
| 6,628,824 B1 | 9/2003 | Belanger |
| 6,961,463 B1 | 11/2005 | Loui et al. |
| 7,421,089 B2 * | 9/2008 | Camara et al. ............... 382/100 |
| 7,647,331 B2 | 1/2010 | Li et al. |
| 8,111,912 B2 * | 2/2012 | Husseini et al. .............. 382/162 |
| 8,185,504 B2 * | 5/2012 | Hino ........................ 707/662 |
| 2002/0033844 A1 | 3/2002 | Levy |
| 2003/0033296 A1 * | 2/2003 | Rothmuller et al. ............ 707/3 |
| 2003/0220894 A1 * | 11/2003 | Russon ........................ 707/1 |
| 2004/0015479 A1 * | 1/2004 | Meek et al. ................... 707/1 |
| 2004/0174434 A1 * | 9/2004 | Walker et al. ............... 348/211.3 |
| 2005/0055337 A1 * | 3/2005 | Bebo et al. ................... 707/3 |
| 2005/0104976 A1 * | 5/2005 | Currans ..................... 348/231.5 |
| 2005/0108280 A1 * | 5/2005 | Kagle et al. ............... 707/103 R |
| 2005/0165795 A1 | 7/2005 | Myka |
| 2006/0036568 A1 | 2/2006 | Moore |
| 2006/0112141 A1 * | 5/2006 | Morris ....................... 707/104.1 |
| 2006/0294077 A1 * | 12/2006 | Bluhm et al. .................. 707/3 |
| 2007/0022374 A1 * | 1/2007 | Huang et al. ................. 715/513 |
| 2007/0112809 A1 * | 5/2007 | Arrouye et al. ............... 707/100 |
| 2007/0127813 A1 | 6/2007 | Shah |
| 2007/0127833 A1 | 6/2007 | Singh |

(Continued)

FOREIGN PATENT DOCUMENTS

EP 990997 A1 4/2000
EP 2 071 578 A1 6/2009

(Continued)

OTHER PUBLICATIONS

Servas et al. "Metadata Creation System for Mobile Images" Jun. 6-9, 2004, MobiSYS'04, ACM.*

(Continued)

*Primary Examiner* — Matthew Bella
*Assistant Examiner* — Jason Heidemann
(74) *Attorney, Agent, or Firm* — Fish & Richardson P.C.

(57) ABSTRACT

Methods, systems, and apparatus, including computer programs encoded on a computer storage medium, are described for resolving duplicate images. In one aspect, a method includes obtaining a selection of a single image from among a plurality of duplicate images. Each duplicate image has an associated set of metadata. The method also includes aggregating each set of metadata into aggregated information, and storing the selected image together with the aggregated information on data storage accessible to a data processing apparatus.

21 Claims, 5 Drawing Sheets

(56) References Cited

U.S. PATENT DOCUMENTS

| | | | |
|---|---|---|---|
| 2007/0237426 A1* | 10/2007 | Xie et al. | 382/305 |
| 2009/0208097 A1* | 8/2009 | Husseini et al. | 382/162 |
| 2009/0278949 A1* | 11/2009 | McMahan et al. | 348/222.1 |
| 2009/0303160 A1 | 12/2009 | Chew et al. | |
| 2009/0319570 A1* | 12/2009 | Subramanian | 707/104.1 |
| 2010/0030752 A1* | 2/2010 | Goldentouch | 707/3 |
| 2010/0046842 A1* | 2/2010 | Conwell | 382/218 |
| 2010/0082568 A1 | 4/2010 | Lee | |
| 2010/0166321 A1* | 7/2010 | Sawant et al. | 382/209 |
| 2011/0103699 A1* | 5/2011 | Ke et al. | 382/209 |
| 2011/0106782 A1* | 5/2011 | Ke et al. | 707/706 |
| 2011/0295775 A1 | 12/2011 | Wang | |
| 2012/0150827 A1 | 6/2012 | Ishii | |

FOREIGN PATENT DOCUMENTS

| | | |
|---|---|---|
| JP | 2000112996 A | 4/2000 |
| JP | 2007235238 A | 9/2007 |
| KR | 2009014754 A | 2/2009 |
| KR | 2010034990 A | 4/2010 |
| WO | WO2008097934 A3 | 11/2008 |
| WO | WO2010078553 A2 | 7/2010 |

OTHER PUBLICATIONS

Hunter et al. "HarvANA—Harvesting Community Tags to Enrich Collection Metadata", Jun. 16-20, 2008, JCDL'08, ACM, pp. 147-156.* http://www.imagecomparer.com, "Duplicate Photo Finder Software for Windows", Copyright Bolide Software 2002-2009, Mar. 25, 2009, 3 pages.

Authorized Officer Karin Exner, International Search Report/Written Opinion in International Application No. PCT/US2011/048812 mailed Dec. 15, 2011, 16 pages.

http://www.rmsft.com/dif/landingpage.html, "Runningman Software—Duplicate Image Finder", accessed Jul. 9, 2010.

http://www.apple.com/downloads/macosx/imaging_3d/duplicateimagedetector.html, "Duplicate Image Detector 2.1.0.32", accessed Jul. 9, 2010.

http://www.mindgems.com/products/VS-Duplicate-Image-Finder/VSDIF-About.htm, MindGems Innovative Software Products, access Jul. 9, 2010.

International Preliminary Report on Patentability, International Application No. PCT/US2011/048812, 10 pages, Mar. 5, 2013.

EPO Office Action for Application No. 11749694.3-1910 dated Jan. 24, 2014, 9 pages.

Howard Jack: "The Pentax K-7: The era of in-camera High Dynamic Range Imaging has arrived! from Adorama Learning Center", ADORAMA, May 20, 2009, XP055096384, Retrieved from the Internet: URL:http://www.adorama.com/alc/0011608/blogarticle/The-Pentax-K-7-The-era-of-in-camera-High-Dynamic-Range-/Imaging-has-arrived [retrieved on Jan. 14, 2014].

Jaimes A et al; "Duplicate Detection in Consumer Photography and News Video", Proceedings ACM Multimedia 2002. 10th. International Conference on Multimedia. Juan-Les-Pins, France, Dec. 1-6, 2002; ACM, New York, NY, vol. Conf. 10, Dec. 1, 2002, p. 423/424, XP001175040, DOI: 10.1145/641007.641098, ISBN: 978-1-58113-620-3.

Evaggelos Spyrou et al: "Fusing MPEG-7 Visual Descriptors for Image Classification", Aug. 13, 2005, Artificial Neural Networks: Biological Inspirations Â ICANN 2005; [Lecture Notes in Computer Science;;LNCS], Springerverlag, Berlin/Heidelberg, p. 847-852, XP019014957, ISBN: 978-3-540-28755-1.

Japan Office Action for Application No. 2013-527116 dated Feb. 28, 2014, 24 pages.

Japan Office Action Summary (in English) for Application No. 2013-527116 dated Mar. 26, 2014, 2 pages.

Korean Notice of Preliminary Rejection (Non-Final), with English Translation, for Application No. 10-2013-7008191 dated Mar. 31, 2014, 7 pages.

U.S. Non-Final Office Action for U.S. Appl. No. 14/186,488, filed Mar. 27, 2014, 18 pages.

* cited by examiner

| Set of metadata associated with a duplicate image 150 | | |
|---|---|---|
| *Attribute* | *Attribute value* | *Attribute value input/ assigned by* |
| title | "Pat and classmate" | Terry |
| acquisition time | 05/16/2008 | camera |
| acquisition geo-location | null | camera |
| modify time | 06/22/2008 | Iphoto |
| identity of faces depicted in image | Pat | Jenny |
| adjustment type | B&W | Terry |
| adjustment date | 06/22/2008 | Iphoto |
| size | 3504x2336 (8.2MP) 10.3 MB | Iphoto |
| file type | PNG | Iphoto |
| address of network location | www.JennysTravels.net/safari/23.jpg | Jenny |
| ⋮ | ⋮ | ⋮ |

FIG. 1B

| Aggregated information associated with a plurality of duplicate images 222 | | |
|---|---|---|
| *Aggregated Attribute* 224 | *Primary Attribute* 226 | *Set of Additional Attributes* 228 |
| title (224-a) | title of duplicate-"j" | title of duplicate-"i"; title of duplicate-"k"; ... |
| acquisition time (224-b) | common acquisition time | null |
| acquisition geo-location (224-c) | acquisition geo-location of duplicate "i" | null |
| modify time (224-d) | modify time of selected duplicate (e.g., "j") | modify time of duplicate-"i"; modify time of duplicate-"k"; ... |
| identity of faces depicted in image (224-e) | identity of faces depicted in duplicate-"k" | null |
| adjustment type (224-f) | adjustment type of solely adjusted duplicate (e.g., "j") | null |
| adjustment date (224-g) | corresponding adjustment date | null |
| size (224-h) | size of selected duplicate (e.g., "j") | size of duplicate-"i"; size of duplicate-"k"; ... |
| file type (224-i) | file type of selected duplicate (e.g., "j") | file type of duplicate-"i"; file type of duplicate-"k"; ... |
| address of network location (224-j) | network address of selected duplicate (e.g., hyperlink of "j") | network address (e.g., card-link) of duplicate-"i"; ... |
| ... | ... | ... |

FIG. 2B

CONSOLIDATING INFORMATION RELATING TO DUPLICATE IMAGES

BACKGROUND

This specification relates to resolving duplicate images, for example, by consolidating information relating to a set of duplicate images. Duplicate images sometimes result from or otherwise arise in image organizing and/or processing applications. For example, a low resolution and/or size preview file can be generated along with an original, high resolution image file. In addition, duplicates can be generated when importing image files from a camera if some of currently imported images have been previously imported. In addition to duplicating images, applications sometimes generate and maintain duplicate sets of associated metadata. Under some circumstances, duplicate images and their respective sets of associated metadata are stored in an image library, or separately in different image libraries.

SUMMARY

This specification describes technologies relating to resolving duplicate images from one or more library of digital images. Specifically, the described technologies relate to selecting an image from among a set of duplicate images and consolidating information relating to each and every one of the set of duplicate images. The selected image and the consolidated information can be retained for future use, while the unselected images from the set of duplicate images can be discarded.

In general, one aspect of the subject matter described in this specification can be implemented in methods that include the actions of obtaining a selection of a single image from among a plurality of duplicate images. Each duplicate image has an associated set of metadata. The methods also include aggregating each set of metadata into aggregated information, and storing the selected image together with the aggregated information on data storage accessible to the data processing apparatus.

These and other implementations can include one or more of the following features. Each set of metadata can include one or more image attributes. An image attribute can include one of an image label, an acquisition time, an acquisition geo-location, a time when the duplicate image was modified, identity of faces depicted in the duplicate image, and information including an adjustment that was applied to the image, and a time when the adjustment was applied. The aggregated information associated with the selected image can include one or more aggregated attributes corresponding to the respective one or more image attributes associated with each duplicate image. An aggregated attribute corresponding to a respective image attribute can include a primary attribute and a set of additional attributes.

In some implementations, the methods can further include organizing the stored image along with other non-duplicate images on the data storage based on respective one or more primary attributes of the one or more aggregated attributes included in the aggregated information associated with the stored image. For example, organizing can include at least one of sorting, grouping, joining and classifying. Furthermore, the methods can include providing a report of activity relating to the stored image based on respective one or more sets of additional attributes of the one or more aggregated attributes included in the aggregated information associated with the stored image.

In some implementations, aggregating can include assigning as the primary attribute of the aggregated attribute one of the respective image attributes of the duplicate images based on an assignment rule, and forming the set of additional attributes of the aggregated attribute from respective image attributes of the duplicate images that are distinct from the primary attribute. For example, the assignment rule includes mapping a respective image attribute of the selected image to the primary attribute of the aggregated attribute. As another example, the assignment rule includes mapping a respective image attribute that was input by a user associated with the data storage to the primary attribute of the aggregated attribute. As another example, the assignment rule includes mapping a respective image attribute of an earliest duplicate image to the primary attribute of the aggregated attribute. As another example, the assignment rule includes mapping a respective image attribute of a latest duplicate image to the primary attribute of the aggregated attribute. As another example, the assignment rule includes mapping a respective image attribute that is not null to the primary attribute of the aggregated attribute.

In addition, the methods can include mapping each of a set of additional addresses of network locations associated with unselected duplicate images to a primary address of network location associated with a selected duplicate image.

The methods can also include discarding the duplicate images except for the selected image. Additionally, the methods can include suggesting the single image from among the plurality of duplicate images. In some implementations, obtaining the selection includes selecting the suggested single image. In some implementations, obtaining the selection includes receiving an indication of the single image from a user associated with the data storage.

The subject matter described in this specification can be implemented as a method or as a system or using computer program products, tangibly embodied in information carriers, such as a CD-ROM, a DVD-ROM, a HD-DVD-ROM, a Blue-Ray drive, a semiconductor memory, and a hard disk. Such computer program products may cause a data processing apparatus to conduct one or more operations described in this specification. In addition, the subject matter described in this specification can also be implemented as a system including a processor and a memory coupled to the processor. The memory may encode one or more programs that cause the processor to perform one or more of the method acts described in this specification. Further the subject matter described in this specification can be implemented using various data processing machines.

Particular implementations of the subject matter described in this specification can be configured so as to realize one or more of the following advantages. Aggregated information is configured to include non-redundant (distinct) and complete information related to the set of duplicate images. Accordingly, duplicate images can be removed without losing added information and data which may be attached to them. For instance, a set of three duplicate images includes a first image processed to remove red-eye, a second image uploaded online (e.g., to a social networking site,) and third image used for a holiday card. The disclosed techniques ensure that the edits, the online status, or the holiday card status of the respective images would not be compromised (e.g., edits would not be lost or images would not be missing) when two out of the three duplicates are deleted. In fact, the methods and systems described in this specification ensure that upon removing two of the three duplicate images, the remaining image would be edited, would be published on line, and would be part of the holiday card.

Further, the disclosed techniques potentially enable reducing the storage space required for the complete information relating to the set of duplicate images, without compromising the completeness of the aggregated information. Moreover, the aggregated information can be used to track activity related to the set of duplicated images.

Details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIG. 1B is an example of a set of metadata associated with each duplicate image.

FIG. 2B is an example of aggregated information associated with a set of duplicate images.

Like reference numbers and designations in the various drawings indicate like elements.

DETAILED DESCRIPTION

Figure 1A:
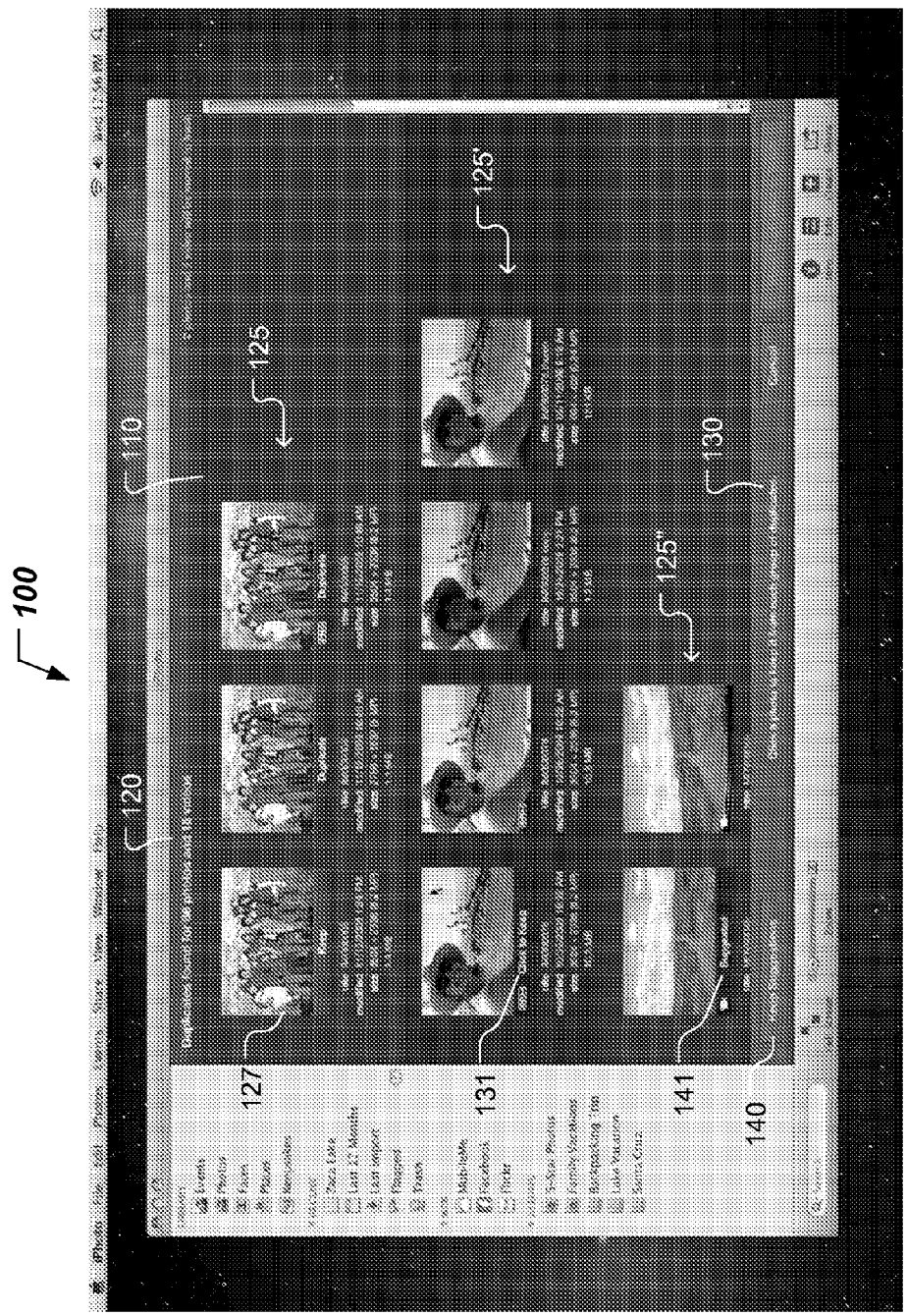
FIG. 1A is an illustration of multiple sets of duplicate images within an image manipulation software application.

FIG. 1A is an illustration of multiple sets of duplicate images 125, 125' and 125" within an image manipulation software application 100. The image manipulation software application 100 can run on a computer system that may be communicatively coupled to a public or private communication network. The computer system can be a laptop, a smart phone, and the like.

The image manipulation software application 100 can include a viewing area 110 configured to display a result 120 in accordance with an action initiated by a user associated with the image manipulation software application 100. In the case illustrated in FIG. 1A, a result 120 shows that duplicates have been found for a number of images, e.g., photos and videos, stored in one or more libraries accessed by the image manipulation software application 100. For example, a set of duplicate photos 125 contains three duplicates, while another set of duplicate photos 125' contains four duplicates. As another example, a set of duplicate videos 125" contains two duplicates.

Upon receiving from a user associated with the image manipulation software application 100 an instruction to find duplicates, the image manipulation software application 100 can analyze target image libraries, i.e., it can go through a set of image files and can perform multiple checks. A first check (representing a coarse-level filter) can be comparing image file names. Upon identifying files that have common names, the application can check the content of the identified files. For example, the content check may include a file size comparison. As another example, the content check may include a bit-comparison. The bit-comparison can be performed at full resolution, or at lower (half, quarter, etc.) resolution. In some implementations, the image manipulation software application 100 can first generate lower resolution images of the identified images, and then it can perform the bit-comparison of the generated lower resolution images.

Once the analysis of the image library is completed, the image manipulation software application 100 can summarize 120 the outcome of the duplicate analysis and can present in the viewer area 110 sets of duplicate images 125, 125', 125", etc. In addition, the image manipulation software application 100 can keep a selected image 127 and can discard the unselected images from the set of duplicate images 125. The selected image 127 can be marked, e.g., using a "Keep" label and placing the selected image 127 at the leftmost position of the set of duplicate images 125. In some implementations, selection of the duplicates to keep may be made by a user associated with the image manipulation software application 100 on an item-by-item basis 130. For example, the image to keep may be presented in the leftmost position of a set of duplicate images 125' and may be marked "Click to Keep" 131. In some implementations, selection of the duplicates to keep may be performed automatically 140 by the image manipulation software application 100 (with a choice to undo the selection upon user request.) For example, the image manipulation software application 100 can suggest 141 a video to keep from a set of duplicate videos 125" (e.g., by placing the video to keep in the leftmost position of a set of duplicate images).

In some implementations, the image manipulation software application 100 may further provide an indication of why it had chosen the image to keep from among the duplicate images. Additionally, the deleted duplicates are placed in a Trash of the image manipulation software application 100 (not the operating system Trash), i.e., duplicates are not being removed from storage and can be recovered if the user desires so.

The criterion for keeping a particular duplicate may include one or more of a highest resolution, an earliest or latest acquisition time, a largest set of associated metadata, a previous modification (suggesting that the user cares about that image), and the like. FIG. 1B is an example of a set of metadata 150 associated with a duplicate image. Each set of metadata 150 includes one or more image attributes 152. An image attribute 152 can have a corresponding attribute value 154 and a corresponding record 156 to indicate how the attribute value was entered.

For example, an image attribute 152 can be an image title 152-a. In reference with FIG. 1B, the image title value is the string "Pat and classmate", and the image title was input by a user of the image manipulation software application 100 named Terry. In reference with FIG. 1A, the title value of image 127 is the string "IMG00005", and the image title was automatically assigned by an image capture device which acquired image 127.

As another example, an image attribute 152 can be an acquisition time 152-b. In this example, the acquisition time value is the date "May 16, 2008", and the acquisition time was automatically assigned by an image capture device which acquired the image. As yet another example, an image attribute 152 can be an acquisition geo-location 152-c. In this example, the acquisition geo-location value is null. A "null value" for an image attribute represents a lack of value for this image attribute. In this instance, the null acquisition geo-location was automatically assigned by an image capture device which acquired the image and had no means to detect the geo-location of the image capture device at the time when the image was acquired. If the image capture device were equipped with a geo-location detection, the latitude and longitude of the acquisition geo-location can be recorded as the acquisition geo-location value. Moreover, the acquisition geo-location value can be input by a user associated with the image manipulation software application 100, and may be, e.g., the string "UCLA campus."

Another image attribute 152 can be a time when the duplicate image was modified. For example, a modify time value for the rightmost image of the set of duplicate images 125 in FIG. 1A is the daytime "Nov. 12, 2008 10:46," which was automatically assigned by the image manipulation software application 100, in this example Iphoto. Another image attribute 152 can include identity of faces depicted in the duplicate image. For example, a value for the identity of faces value may be the string "Pat". This value can be automatically assigned by the image manipulation software application 100 configured with a face recognition feature, or by a user, e.g. Jenny, associated with the image manipulation software application 100. Other image attributes 152 can be an adjustment (and/or a preset adjustment) that was applied to the image, and a time when the adjustment was applied. For example, the adjustment value can be "Black-And-White" (B&W), and may have been applied automatically by the image manipulation software application 100 upon importing an image from an image capture device. In another example, the preset adjustment may be applied by a user associated with the image manipulation software application 100. The value for the time when the adjustment was applied and how the value was assigned/input can be recorded correspondingly. Other image attributes 152 can be an image size, e.g. 604×402 (0.24 MP) 123 KB, and an image type, e.g., PNG or RAW, and the like. Another image attribute 152 can include an address of a network location (file path, hyperlink, and the like) where the image was uploaded to by a user associated with the image manipulation software application 100. For example, the image was uploaded to a social networking site by Jenny. As another example, the image was incorporated in an online holiday card (or in an image collage, etc.) that was distributed, e.g. via email, to Terry's distribution list. The set of metadata 150 associated with a duplicate image can include multiple other image attributes.

Attribute values 154 (and/or respective assignment records 156) corresponding to a given attribute 152 included in sets of metadata 150 associated with duplicate images can be relatively distinct or common among the set of duplicate images. For example, image 127 from the set of duplicate images 125 has a modify date value of Nov. 13, 2008; the other two images from the same set of duplicates 125 have a modify date value of Nov. 12, 2008 which is earlier relative to image 127, but common relative to each other. Further, image 127 may have been modified by a user of the image manipulation software application 100, while one or both of the other two images from the same set may have been automatically modified by the image manipulation software application 100. The techniques and systems disclosed in this specification enable consolidation of the information included in multiple sets of metadata associated with duplicate images. For example, as described in detail in connection with FIGS. 2A-2B and 3, attributes 152 of duplicate images that were selected for removal can be aggregated within aggregated information associated with the image selected to keep.

Figure 2A:
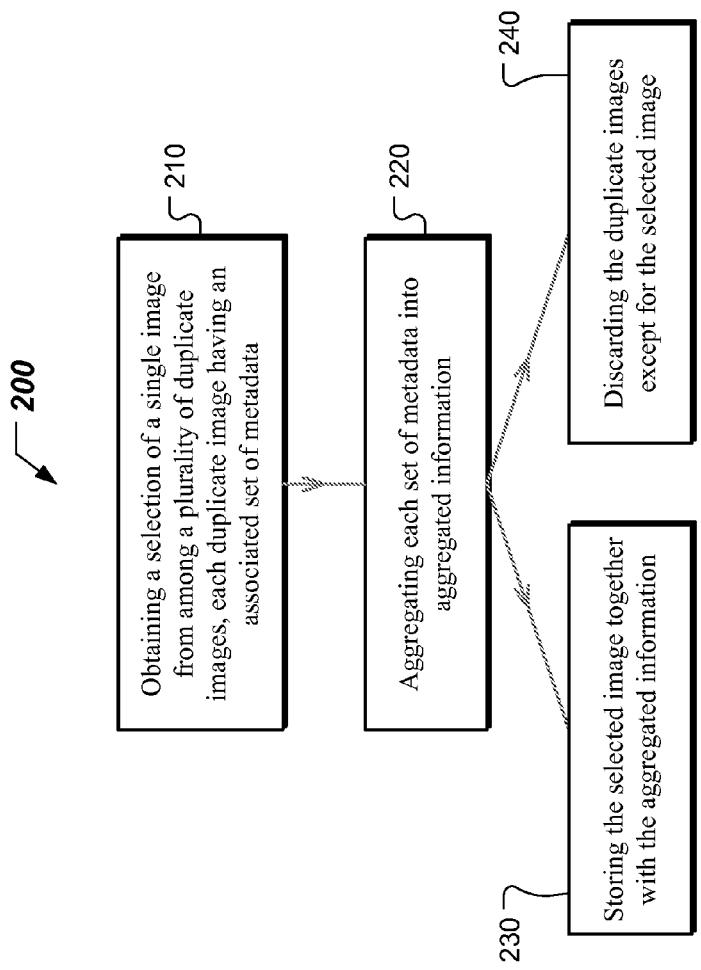
FIG. 2A is a flow chart illustrating a method of storing aggregated information associated with a set of duplicate images along with a selected image from among the set of duplicate images.

FIG. 2A is a flow chart illustrating an example of a method 200 of storing aggregated information associated with a set of duplicate images along with a selected image from among the set of duplicate images. The method 200 can be performed by a data processing apparatus and can be implemented as part of the image manipulation software application 100. The method 200 includes obtaining 210 a selection of a single image from among a plurality of duplicate images. Each duplicate image has an associated set of metadata. The method further includes aggregating 220 each set of metadata into aggregated information. Furthermore, the method 200 includes storing 230 the selected image together with the aggregated information on data storage accessible to the data processing apparatus. The method 200 can also include discarding 240 the duplicate images except for the selected image.

In some implementations, obtaining 210 the selection of a single image from among a plurality of duplicate images can be performed automatically by the image manipulation software application 100. In the example illustrated in FIG. 1A, the image manipulation software application 100 can suggest 141 an image to keep from a set of duplicates (e.g., by placing the image to keep in the leftmost position of a set of duplicate images). In this case, the suggested image can be automatically selected for storage as a representative image of the set of duplicates. In some implementations, obtaining 210 the selection of a single image from among a plurality of duplicate images can be performed by a user associates with the image manipulation software application 100. For example, the image to keep may be presented by the image manipulation software application 100 in the leftmost position of a set of duplicate images and may be marked "Click to Keep" 131.

Aggregating 220 each set of metadata into aggregated information includes consolidating information into aggregated attributes corresponding to the image attributes described above in connection with FIG. 1B. Moreover, FIG. 2B is an example of aggregated information 222 associated with a set of duplicate images. The aggregated information 222 associated with the selected image includes one or more aggregated attributes 224 corresponding to the respective one or more image attributes 152 associated with each duplicate image. An aggregated attribute 224 corresponding to a respective image attribute 152 includes a primary attribute 226 and a set of additional attributes 228.

An example of an aggregated attribute 224 is a title 224-a. The primary attribute 226 corresponding to the title 224-a represents the primary title and can be the title of duplicate image "j", for instance. The duplicate image "j" can (but does not need to) be the selected duplicate image. The set of additional titles corresponding to the title 224-a can include titles of the other duplicate images "i", "k", . . . , that are distinct from the primary title. Detailed rules for assigning a primary attribute 226 and for forming a set of additional attributes 228 are described in detail below in connection with FIG. 3. In this example, the title of image "j" is assigned as the primary title because it may have been entered by a user of the image manipulation software application 100, in contrast with the titles of the other duplicate images "i", "k", . . . , which may have been automatically generated, either by a camera that captured the original image, or by the image manipulation software application 100. As another example, consider the set of duplicate images 125 illustrated in FIG. 1A. In this example, each of the three duplicates 125 has the same title "IMG00005" which was automatically assigned by the camera that captured the original image. In this example, the primary title corresponding to the title 224-a is "IMG00005". Further in this example, the additional set of titles corresponding to the title 224-a is null, since there are no distinct titles to be included in the set of additional titles. A null set represents a set that has zero elements or an empty set.

Another example of an aggregated attribute 224 is an acquisition time 224-b. The primary attribute 226 corresponding to the acquisition time 224-b represents the acquisition time of the original image. The set of additional acquisition times corresponding to the acquisition time 224-b is null as the acquisition time of any of the duplicate image is unique, i.e., indistinguishable from the primary acquisition time.

Another example of an aggregated attribute 224 is an acquisition geo-location 224-c. The primary attribute 226 corresponding to the acquisition geo-location 224-c represents the acquisition geo-location of duplicate image "i". Further, the duplicate image "i" may be the only one among the set of duplicate images having a geo-location that had been entered by a user associated with the image manipulation software application 100. Furthermore, the duplicate image "i" can (but does not need to) be the selected duplicate image. The set of additional acquisition geo-locations corresponding to the acquisition geo-location 224-c is null as no other duplicate images has a recorded geo-location, in this instance.

Another example of an aggregated attribute 224 is a modify time 224-d. The primary attribute 226 corresponding to the modify time 224-d represents the primary modify time, and is the modify time of the selected duplicate image (e.g., "j"). The set of additional modify times corresponding to the modify time 224-d includes modify times of the unselected duplicate images (e.g., "i", "k", . . . ) that are distinct from the primary modify time. For instance, consider the set of duplicate images 125 illustrated in FIG. 1A. In this instance, the primary modify time corresponds to the modify time of the selected image 127, namely Nov. 13, 2008 1:24 PM. The set of additional modify times corresponding to the modify time 224-d includes one element, namely Nov. 12, 2008 10:46 AM, which corresponds to a common modify time of the unselected images of the set of duplicate images 125.

Another example of an aggregated attribute 224 is an identity of faces depicted in an image 224-e. The primary attribute 226 corresponding to the identity of faces 224-e represents the identity of faces depicted in duplicate image "k". Further, the duplicate image "k" may be the only one among the set of duplicate images having identified faces that had been identified by a user associated with the image manipulation software application 100 or that had been automatically identified by the image manipulation software application 100. Furthermore, the duplicate image "k" can (but does not need to) be the selected duplicate image. The set of additional identities of faces corresponding to the identity of faces 224-e is null since no other duplicate images has a recorded identity of faces, in this instance.

Another example of an aggregated attribute 224 is an adjustment type 224-f. The primary attribute 226 corresponding to the adjustment type 224-f represents the adjustment type of duplicate image "j". Further, the duplicate image "j" may be the only one among the set of duplicate images having been adjusted by a user associated with the image manipulation software application 100 or that had been automatically adjusted by the image manipulation software application 100. Furthermore, the duplicate image "j" can (but does not need to) be the selected duplicate image. The set of additional adjustment types corresponding to the adjustment type 224-f is null since no other duplicate images have been adjusted, in this instance. An adjustment date 224-g corresponds to and is determined in a similar manner as the adjustment type 224-f.

Another example of an aggregated attribute 224 is a size 224-h. The primary attribute 226 corresponding to the size 224-h represents the primary size, and is the size of the selected duplicate image (e.g., "j"). The set of additional sizes corresponding to the size 224-h includes sizes of the unselected duplicate images (e.g., "i", "k", . . . ) that are distinct from the primary size. For instance, consider the set of duplicate images 125 illustrated in FIG. 1A. In this instance, the primary size corresponds to the size of the selected image 127, namely 3504×2336 (8.2 MP) 1.4 MB. The set of additional sizes corresponding to the size 224-h includes one element, namely 2756×1837 (5 MP) 1.1 MB, which corresponds to a size of one of the unselected images that is distinct from the primary size.

Another example of an aggregated attribute 224 is a file type 224-i. The primary attribute 226 corresponding to the file type 224-i represents the primary file type, and is the file type of the selected duplicate image (e.g., "j"). The set of additional file types corresponding to the file type 224-i includes file types of the unselected duplicate images (e.g., "i", "k", . . . ) that are distinct from the primary file types. For instance, consider the set of duplicate images 125 illustrated in FIG. 1A. In this instance, the primary file type corresponds to the file type of the selected image 127, namely TIFF. The set of additional file types corresponding to the file type 224-i includes one element, namely PNG, which corresponds to a file type of one of the unselected images that is distinct from the primary file type. The aggregated information 222 associated with a set of duplicate images can include multiple other aggregated attributes.

Another example of an aggregated attribute 224 is an address of network location 224-j. The primary attribute 226 corresponding to a hyperlink 224-j represents the address of network location at which the duplicate image "j" was uploaded by a user associated with the image manipulation software application 100. In some instances, the duplicate image "j" may be the only one among the set of duplicate images having been uploaded to a specified webpage or to a social networking site. Furthermore, the duplicate image "j" can (but does not need to) be the selected duplicate image. In these instances, the set of additional addresses of network locations corresponding to the address of network location 224-j is null since no other duplicate images have been uploaded. In some other instances, the set of additional addresses of network locations corresponding to the address of network location 224-j includes addresses of network locations of the unselected duplicate images (e.g., "i", . . . ) that are distinct from the primary address of network location. For instance, a network address corresponding to duplicate-"i" that has been distributed as part of a holiday card may be an address of the holiday card's network location. Moreover, the network addresses from among the set of additional addresses of network locations corresponding to the unselected duplicate images can be automatically mapped to the primary address of network location 224-j. For example, the holiday card which was generated using the unselected duplicate image "i" is being updated automatically upon performing method 200 to include the selected duplicate image "j" corresponding to the primary address of network location 224-j.

Returning to the method 200 illustrated in FIG. 2A, in some implementations, storing 230 the selected image together with the aggregated information 222 on data storage can be performed by the image manipulation software application 100 for readily organizing the stored image along with other non-duplicate images stored on the data storage. The organizing can be based on respective one or more primary attributes 226 of the one or more aggregated attributes 224 included in the aggregated information 222 associated with the stored image. For example, the organizing can include at least one of sorting, grouping, joining and classifying the stored image along with other non-duplicated images stored on the data storage. Additionally, respective one or more sets of additional attributes 228 of the one or more aggregated attributes 224 included in the aggregated information 222 associated with the stored image can be used for providing a report of activity (history) relating to the stored image.

In some implementations, discarding 240 the unselected duplicate images can be performed automatically by the image manipulation software application 100. In the example illustrated in FIG. 1A, the image manipulation software application 100 can move the unselected images from the set of duplicates 125, 125' and 125" to the application trash. However, items moved from an image library to the trash of the image manipulation software application 100 can be restored to originating image libraries in response to instructions received from a user associated with the image manipulation software application 100.

Figure 3:
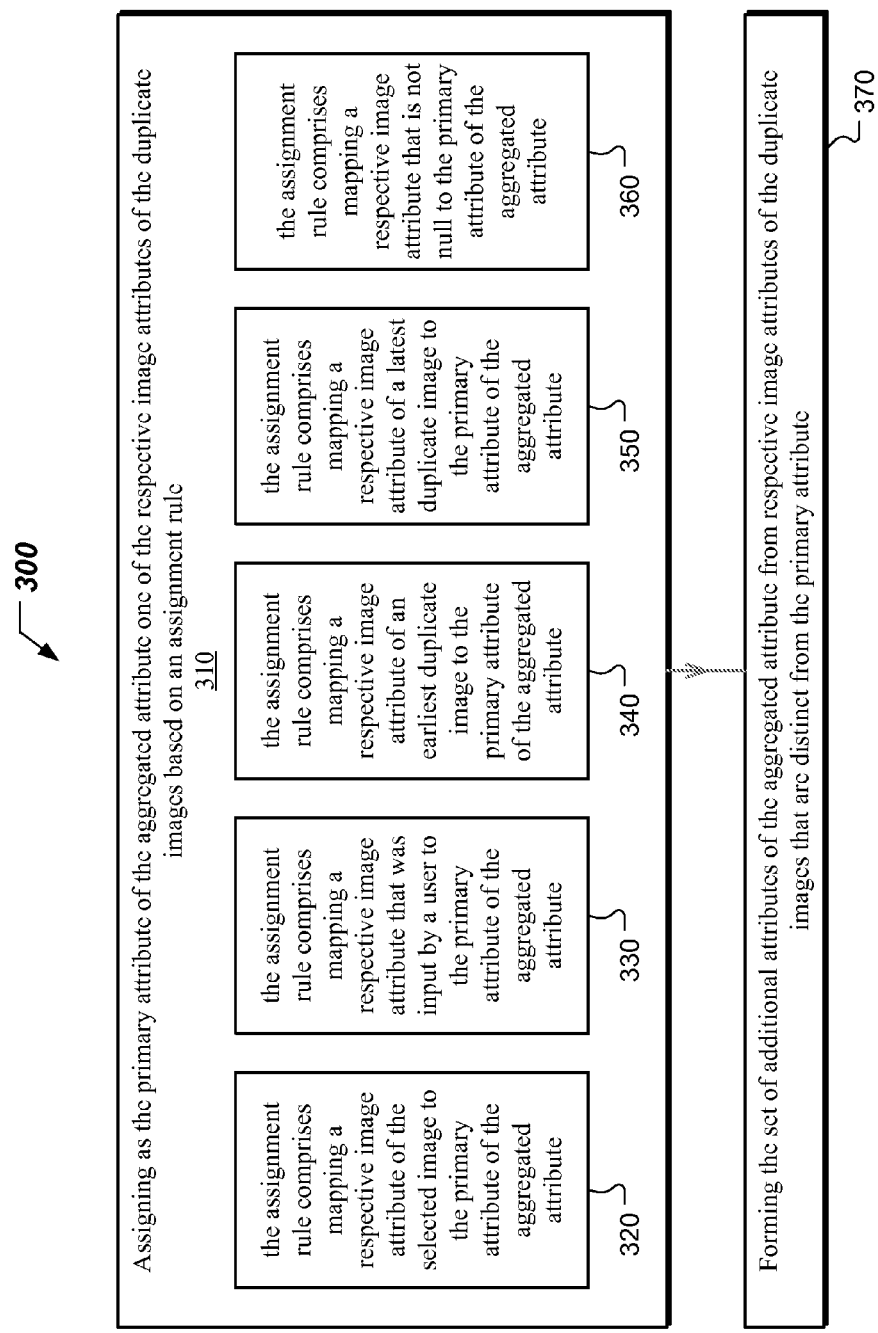
FIG. 3 is a flow chart illustrating a method of aggregating information associated with a set of duplicate images.

FIG. 3 is a flow chart illustrating an example of a method 300 of aggregating information associated with a set of duplicate images. In some implementations, the method 300 can performed by a data processing apparatus and can be implemented as part of the image manipulation software application 100. The method 300 includes assigning 310 as the primary attribute 226 of the aggregated attribute 224 one of the respective image attributes 152 of the duplicate images based on an assignment rule. Further, the method 300 includes forming 370 the set of additional attributes 228 of the aggregated attribute 224 from respective image attributes 152 of the duplicate images that are distinct from the primary attribute 226.

In some implementations, the assignment rule can included mapping 320 a respective image attribute 152 of the selected image to the primary attribute 226 of the aggregated attribute 224. For example, the primary attributes 226 included in aggregated information 222 can have a one-to-one correspondence to the respective attributes 152 included in the set of metadata 150 associated with the selected image.

In some implementations, the assignment rule can include mapping 330 a respective image attribute 152 that was input by a user associated with the image manipulation software application 100 to the primary attribute 226 of the aggregated attribute 224. In this manner, the image manipulation software application 100 assigns to the primary attributes 226 corresponding image attributes 152 having values 154 that were entered and validated by the user associated with the image manipulation software application 100.

In some implementations, the assignment rule can include mapping 340 a respective image attribute 152 of an earliest modified duplicate image to the primary attribute 226 of the aggregated attribute 224. For example, the image manipulation software application 100 may assign to the primary attributes 226 many or all corresponding image attributes 152 of the originally captured image.

In some implementations, the assignment rule can also include mapping 350 a respective image attribute 152 of a latest modified duplicate image to the primary attribute 226 of the aggregated attribute 224. In this manner, the image manipulation software application 100 assigns to the primary attributes 226 the most recent corresponding image attributes 152 available among the set of duplicate images.

In some implementations, the assignment rule can include mapping 360 a respective image attribute 152 that is not null to the primary attribute 226 of the aggregated attribute 224. In this manner, the image manipulation software application 100 may generate information rich primary attributes 226 of the aggregated attributes 224.

Additionally, the assignment rule can include combinations of the mapping 320, 330, 340, 350 and 360 for generating the primary attribute 226 of the aggregated attribute 224. For example, the assignment rule can include performing first mapping 340 a respective image attribute 152 of an earliest modified duplicate image to the primary attribute 226 of the aggregated attribute 224, and then performing mapping 360 a respective image attribute 152 that is not null to the primary attribute 226 of the aggregated attribute 224. As another example, the assignment rule can include performing first mapping 330 a respective image attribute 152 that was input by a user associated with the image manipulation software application 100 to the primary attribute 226 of the aggregated attribute 224, and then performing mapping 320 a respective image attribute 152 of the selected image to the primary attribute 226 of the aggregated attribute 224.

A multitude of computing devices may be used to implement the systems and methods described in this document, as either a client or as a server or plurality of servers. A computing device can be implemented in various forms of digital computers, such as laptops, desktops, workstations, personal digital assistants, servers, blade servers, mainframes, and other appropriate computers. Another computing device can be implemented in various forms of mobile devices, such as personal digital assistants, cellular telephones, smartphones, and other similar computing devices. Additionally, computing devices can include Universal Serial Bus (USB) flash drives. The USB flash drives may store operating systems and other applications. The USB flash drives can include input/output components, such as a wireless transmitter or USB connector that may be inserted into a USB port of another computing device. The components described here, their connections and relationships, and their functions, are meant to be exemplary only, and are not meant to limit implementations of the inventions described and/or claimed in this document.

A computing device can include a processor, memory, a storage device, a high-speed interface connecting to memory and high-speed expansion ports. The computing device can further include a low speed interface connecting to a low speed bus and a storage device. Each of the above components can be interconnected using various busses, and may be mounted on a common motherboard or in other manners as appropriate. The processor can process instructions for execution within the computing device, including instructions stored in the memory or on the storage device to display graphical information for a GUI on an external input/output device, such as a display coupled to high speed interface. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

The memory can store information within the computing device. In one implementation, the memory can be a volatile memory unit or units. In another implementation, the memory can be a non-volatile memory unit or units. The memory may also be another form of computer-readable medium, such as a magnetic or optical disk.

The storage device can provide mass storage for the computing device. In one implementation, the storage device may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory, the storage device, or memory on processor.

The high speed controller can manage bandwidth-intensive operations for the computing device, while the low speed controller can manage lower bandwidth-intensive operations. Such allocation of functions is exemplary only. In one implementation, the high-speed controller can be coupled to memory, to a display (e.g., through a graphics processor or accelerator), and to high-speed expansion ports, which may accept various expansion cards. In the implementation, low-speed controller can be coupled to the storage device and the low-speed expansion port. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device may be implemented in a number of different forms. For example, it may be implemented as a standard server, or multiple times in a group of such servers. It may also be implemented as part of a rack server system. In addition, it may be implemented in a personal computer such as a laptop computer. Alternatively, components from computing device may be combined with other components in a mobile device. Each of such devices may contain one or more computing devices or mobile devices, and an entire system may be made up of multiple computing devices and mobile devices communicating with each other.

A mobile device can include a processor, memory, an input/output device such as a display, a communication interface, and a transceiver, among other components. The mobile device may also be provided with a storage device, such as a microdrive or other device, to provide additional storage. Each of the above components is interconnected using various buses, and several of the components may be mounted on a common motherboard or in other manners as appropriate.

The processor can execute instructions within the mobile device, including instructions stored in the memory. The processor of the mobile device may be implemented as a chipset of chips that include separate and multiple analog and digital processors. Additionally, the processor may be implemented using any of a number of architectures. For example, the processor may be a CISC (Complex Instruction Set Computers) processor, a RISC (Reduced Instruction Set Computer) processor, or a MISC (Minimal Instruction Set Computer) processor. The processor may provide, for example, for coordination of the other components of the mobile device, such as control of user interfaces, applications run by the mobile device, and wireless communication by the mobile device.

The processor of the mobile device may communicate with a user through control interface and display interface coupled to a display. The display may be, for example, a Thin-Film-Transistor Liquid Crystal display or an Organic Light Emitting Diode display, or other appropriate display technology. The display interface may include appropriate circuitry for driving the display to present graphical and other information to a user. The control interface may receive commands from a user and convert them for submission to the processor of the mobile device. In addition, an external interface may provide in communication with processor of the mobile device, so as to enable near area communication of the mobile device with other devices. The external interface may provide, for example, for wired communication in some implementations, or for wireless communication in other implementations, and multiple interfaces may also be used.

The memory stores information within the computing mobile device. The memory can be implemented as one or more of a computer-readable medium or media, a volatile memory unit or units, or a non-volatile memory unit or units. An expansion memory may also be provided and connected to the mobile device through an expansion interface, which may include, for example, a SIMM (Single In Line Memory Module) card interface. Such expansion memory may provide extra storage space for the mobile device, or may also store applications or other information for the mobile device. Specifically, expansion memory may include instructions to carry out or supplement the processes described above, and may include secure information also. Thus, for example, expansion memory may be provide as a security module for the mobile device, and may be programmed with instructions that permit secure use of device. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory, expansion memory, or memory on processor that may be received, for example, over transceiver or external interface.

The mobile device may communicate wirelessly through communication interface, which may include digital signal processing circuitry where necessary. Communication interface may provide for communications under various modes or protocols, such as GSM voice calls, SMS, EMS, or MMS messaging, CDMA, TDMA, PDC, WCDMA, CDMA2000, or GPRS, among others. Such communication may occur, for example, through a radio-frequency transceiver. In addition, short-range communication may occur, such as using a Bluetooth, WiFi, or other such transceiver (not shown). In addition, GPS (Global Positioning System) receiver module may provide additional navigation- and location-related wireless data to the mobile device, which may be used as appropriate by applications running on the mobile device.

The mobile device may also communicate audibly using audio codec, which may receive spoken information from a user and convert it to usable digital information. Audio codec may likewise generate audible sound for a user, such as through a speaker, e.g., in a handset of the mobile device. The sound may include sound from voice telephone calls, may include recorded sound (e.g., voice messages, music files, etc.) and may also include sound generated by applications operating on the mobile device.

The mobile computing device may be implemented in a number of different forms. For example, it may be implemented as a cellular telephone. It may also be implemented as part of a smartphone, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), peer-to-peer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method performed by data processing apparatus, the method comprising:
    displaying, in a user interface, a plurality of duplicate images, wherein each duplicate image includes associated metadata comprising one or more image attributes;
    obtaining a selection of a single image from among the plurality of duplicate images;
    generating, for the selected image, aggregated information based on the metadata associated with the plurality of duplicate images, wherein the aggregated information includes one or more aggregated attributes, at least one aggregated attribute generated based on image attributes that are associated with at least two of the duplicate images and are of a same type; and
    storing the selected image together with the aggregated information on data storage accessible to the data processing apparatus.

2. The method of claim 1, wherein an image attribute includes one of:
    an image label;
    an acquisition time;
    an acquisition geo-location;
    a time when the duplicate image was modified;
    identity of faces depicted in the duplicate image;
    an address of a network location to which the image has been uploaded; and
    information including an adjustment that was applied to the image, and a time when the adjustment was applied.

3. The method of claim 1, wherein an aggregated attribute corresponding to a respective image attribute comprises a primary attribute and a set of additional attributes, wherein the primary attribute and the set of additional attributes associated with a same aggregated attribute include information of a same type.

4. The method of claim 1, wherein each of the one or more aggregated attributes includes a primary attribute and a set of additional attributes, the method comprising:
    organizing the stored image along with other non-duplicate images on the data storage based on the primary attributes of the one or more aggregated attributes associated with the stored image.

5. The method of claim 4, wherein the organizing comprises at least one of sorting, grouping, joining or classifying.

6. The method of claim 1, wherein each of the one or more aggregated attributes includes a primary attribute and a set of additional attributes, the method comprising:

providing, to a user, a report of activity related to the stored image based on information corresponding to the sets of additional attributes of the one or more aggregated attributes associated with the stored image.

7. The method of claim 1, wherein each of the one or more aggregated attributes includes a primary attribute and a set of additional attributes, and wherein the aggregating comprises:
assigning, as the primary attribute of an aggregated attribute, an image attribute of one of the duplicate images based on an assignment rule; and
forming the set of additional attributes of the aggregated attribute using image attributes of the remaining duplicate images that include information of a same type as the primary attribute.

8. The method of claim 7, wherein the assignment rule comprises mapping a image attribute of the selected image to the primary attribute of the aggregated attribute, wherein the image attribute of the selected image includes information of a same type as the aggregated attribute.

9. The method of claim 7, wherein the assignment rule comprises mapping, to the primary attribute of the aggregated attribute, a image attribute of one of the duplicate images that was selected by a user associated with the data storage, wherein the mapped image attribute of the duplicate image includes information of a same type as the aggregated attribute.

10. The method of claim 7, wherein the assignment rule comprises mapping a image attribute of an earliest duplicate image to the primary attribute of the aggregated attribute, wherein the mapped image attribute of the earliest duplicate image includes information of a same type as the aggregated attribute.

11. The method of claim 7, wherein the assignment rule comprises mapping a image attribute of a latest duplicate image to the primary attribute of the aggregated attribute, wherein the mapped image attribute of the latest duplicate image includes information of a same type as the aggregated attribute.

12. The method of claim 7, wherein the assignment rule comprises mapping a image attribute that is not null to the primary attribute of the aggregated attribute, wherein the mapped image attribute that is not null includes information of a same type as the aggregated attribute.

13. The method of claim 7, wherein an aggregated attribute includes address of a network location at which the selected image is available, the method comprising:
mapping the address of the network location at which the selected image is available to the primary attribute of the aggregated attribute associated with the selected image; and
mapping additional addresses of network locations associated with unselected duplicate images to additional attributes of the aggregated attribute associated with the selected image.

14. The method of claim 1, further comprising:
discarding the plurality of duplicate images except for the selected image.

15. The method of claim 1, wherein obtaining the selection of the single image comprises:
suggesting, by the data processing apparatus and to a user associated with the data processing apparatus, the single image from among the plurality of duplicate images; and
selecting the suggested single image.

16. The method of claim 1, wherein said obtaining the selection of the single image comprises:
receiving an indication of selection of the single image from a user associated with the data storage.

17. The method of claim 1, wherein an aggregated attribute is generated by consolidating information provided by image attributes that are of same type as the aggregated attribute and are associated with at least two of the duplicate images.

18. The method of claim 17, wherein information provided by the image attributes associated with the aggregated attribute are of a different type from information provided by image attributes that are not associated with the aggregated attribute.

19. A non-transitory computer storage device encoded with a computer program, the program comprising instructions that when executed by data processing apparatus cause the data processing apparatus to perform operations comprising:
displaying, in a user interface, a plurality of duplicate images, wherein each duplicate image includes associated metadata comprising one or more image attributes;
obtaining a selection of a single image from among the plurality of duplicate images;
generating, for the selected image, aggregated information based on the metadata associated with the plurality of duplicate images, wherein the aggregated information includes one or more aggregated attributes, at least one aggregated attribute generated based on image attributes that are associated with at least two of the duplicate images and are of a same type;
storing the selected image together with the aggregated information on data storage accessible to the data processing apparatus; and
discarding the duplicate images except for the selected image.

20. The computer storage device of claim 19, wherein an aggregated attribute corresponding to a respective image attribute comprises a primary attribute and a set of additional attributes, wherein the primary attribute and the set of additional attributes associated with a same aggregated attribute include information of a same type, and wherein generating the aggregated information comprises:
assigning, as the primary attribute of an aggregated attribute, an image attribute of one of the duplicate images based on an assignment rule; and
forming the set of additional attributes of the aggregated attribute using image attributes of the remaining duplicate images that include information of a same type as the primary attribute.

21. A system comprising:
data storage configured to store frames; and
one or more processors communicatively coupled with the data storage and configured to perform operations comprising:
displaying, in a user interface, a plurality of duplicate frames stored on the data storage, wherein each duplicate frame includes associated metadata comprising one or more frame attributes;
obtaining a selection of a single frame from among the plurality of duplicate frames;
generating, for the selected frame, aggregated information based on the metadata associated with the plurality of duplicate frames, wherein the aggregated information includes one or more aggregated attributes, at least one aggregated attribute generated based on frame attributes that are associated with at least two of the duplicate frames and are of a same type, wherein an aggregated attribute corresponding to a respective frame attribute comprises a primary attribute and a set of additional attributes, wherein the primary attribute and the set of additional attributes associated with a same aggregated attribute include information of a same type, and wherein generating the aggregated information comprises:
assigning as the primary attribute of an aggregated attribute, a frame attribute of one of the duplicate frames based on an assignment rule; and
forming the set of additional attributes of the aggregated attribute using frame attributes of the remaining duplicate frames that include information of a same type as the primary attribute;
storing the selected frame together with the aggregated information on the data storage; and
discarding the plurality of duplicate frames except for the selected frame.

* * * * *